(12) United States Patent
Bucu et al.

(10) Patent No.: US 12,294,643 B2
(45) Date of Patent: May 6, 2025

(54) AUTOMATED MANAGEMENT OF BLOCKCHAIN KNOWLEDGE REPOSITORIES

(71) Applicant: MICROSOFT TECHNOLOGY LICENSING, LLC, Redmond, WA (US)

(72) Inventors: Jayronn Christian Sulit Bucu, Bellevue, WA (US); Siddharth Pavithran, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 378 days.

(21) Appl. No.: 17/843,713

(22) Filed: Jun. 17, 2022

(65) Prior Publication Data

US 2023/0412363 A1     Dec. 21, 2023

(51) Int. Cl.
*H04L 9/40*     (2022.01)
*H04L 9/00*     (2022.01)
*H04L 9/08*     (2006.01)

(52) U.S. Cl.
CPC ............ *H04L 9/0819* (2013.01); *H04L 9/50* (2022.05); *H04L 63/1408* (2013.01)

(58) Field of Classification Search
None
See application file for complete search history.

(56) References Cited

U.S. PATENT DOCUMENTS

2022/0101326 A1*   3/2022   Kim ................... G06Q 20/4016
2022/0270084 A1*   8/2022   Xue ......................... H04L 9/088

FOREIGN PATENT DOCUMENTS

WO          2020149790 A1       7/2020

OTHER PUBLICATIONS

Gomez, et al., "Detecting Cybercriminal Bitcoin Relationships through Backwards Exploration", In Repository of arXiv:2206.00375v1, Jun. 1, 2022, 17 Pages.
"International Search Report and Written Opinion Issued in PCT Application No. PCT/US23/022437", Mailed Date: Aug. 14, 2023, 13 Pages.
"Anti-Phishing and Brand Protection Solutions", Retrieved from: https://www.phishfort.com/?msclkid=1c54a3d6aff711ecb6 323e3819399ba0, Retrieved On: Jun. 22, 2022, 5 Pages.
"Blockchain & Cryptocurrency Forensics", Retrieved from: https://web.archive.org/web/20220407074129/https://www.eidebailly.com/services/fraud-and-forensic-advisory/blockchain-and-cryptocurrency-forensics, Apr. 7, 2022, 8 Pages.

(Continued)

*Primary Examiner* — Nelson S. Giddins
(74) *Attorney, Agent, or Firm* — Shook, Hardy & Bacon L.L.P.

(57) ABSTRACT

In one example aspect, a first content item is received. First metadata from the first content item; detecting a match between the first metadata and at least one predetermined metadata element in a knowledge repository pertaining to a target blockchain context; determining a first blockchain wallet address associated with the first content item; locating a second content item based on the first blockchain wallet address; extracting second metadata from the second content item; and updating the knowledge repository based on the second metadata extracted from the second content item.

20 Claims, 7 Drawing Sheets

(56) References Cited

OTHER PUBLICATIONS

"Common Cryptocurrency Scams and How to Avoid Them", Retrieved from: https://web.archive.org/web/20220423033751/https://www.kaspersky.com/resource-center/definitions/cryptocurrency-scams, Apr. 23, 2022, 9 Pages.

"How MetaCert Works", Retrieved from: https://web.archive.org/web/20210814021637/https://metacert.com/how-it-works.html, Aug. 14, 2021, 8 Pages.

"How to Spot Phishing Attacks (Crypto Edition)", Retrieved from: https://web.archive.org/web/20210415234314/https://www.phishfort.com/blog/staying-safe-online, Sep. 12, 2019, 8 Pages.

"Phishing Enumeration—Understanding a Crypto Phishing Attack", Retrieved from: https://web.archive.org/web/20210514141052/https://www.phishfort.com/blog/cryptocurrency-phishing-fingerprint, Sep. 12, 2019, 5 Pages.

"Real-time Fraud Detection", Retrieved from: https://web.archive.org/web/20220430094908/https://docs.microsoft.com/en-us/azure/architecture/example-scenario/data/fraud-detection, Apr. 30, 2022, 6 Pages.

"Technology", Retrieved from: https://metacert.com/technology.html?msclkid=1c560532aff711eca4cc6cd92cf10367, Retrieved On: Jun. 22, 2022, 12 pages.

"The Crypto Security Browser Extension", Retrieved from: https://web.archive.org/web/20220201211548/https://www.phishfort.com/protect, Feb. 1, 2022, 7 Pages.

"Understanding Cryptocurrency Scams", Retrieved from: https://web.archive.org/web/20220516132947/https://cryptostaunch.com/cryptocurrency-scams.html, May 16, 2022, 7 Pages.

"Application as Filed in U.S. Appl. No. 17/720,294", Filed Date: Apr. 14, 2022, 66 Pages.

Avena, Eric, "The Science behind Microsoft Threat Protection: Attack Modeling for Finding and Stopping Evasive Ransomware", Retrieved From: https://argonsys.com/microsoft-cloud/library/the-science-behind-microsoft-threat-protection-attack-modeling-for-finding-and-stopping-evasive-ransomware/?msclkid=28b60074af3d11ec960acce47a4f0d9f, Jun. 10, 2020, 8 Pages.

Carroll, et al., "Inside Microsoft 365 Defender: Attack Modeling for Finding and Stopping Lateral Movement", Retrieved from: https://www.microsoft.com/security/blog/2020/06/10/the-science-behind-microsoft-threat-protection-attack-modeling-for-finding-and-stopping-evasive-ransomware/?msclkid=28b4bc73af3d11ecbf717a89e2a8257c, Jun. 10, 2020, 16 Pages.

Liu, Sylvie, "What's new: Fusion Detection for Ransomware", Retrieved from: https://techcommunity.microsoft.com/t5/microsoft-sentinel-blog/what-s-new-fusion-detection-for-ransomware/ba-p/2621373?msclkid=28b5b1f9af3d11eca985e370e10ccacf, Aug. 9, 2021, 6 Pages.

Lukic, David, "Machine Learning and AI in Fraud", Retrieved from: https://en.cryptonomist.ch/2020/11/22/machine-earning-ai-in-fraud/, Nov. 22, 2020, 6 Pages.

Poudyal, et al., "A Framework for Analyzing Ransomware using Machine Learning", In Proceedings of Symposium Series on Computational Intelligence, Nov. 18, 2018, pp. 1692-1699.

Reiff, Nathan, "How to Identify Cryptocurrency and ICO Scams", Retrieved from: https://www.investopedia.com/tech/how-identify-cryptocurrency-and-ico-scams/, Mar. 28, 2022, 8 Pages.

Riley, et al., "PhishFort—Protect", Retrieved from: https://github.com/phishfort/protect, Jan. 20, 2022, 2 Pages.

Robertson, Matthew, "Three Ways to Detect Cryptomining Activities using Network Security Analytics", Retrieved from: https://blogs.cisco.com/security/three-ways-to-detect-cryptomining-activities-using-network-security-analytics, Dec. 20, 2018, 9 Pages.

Spadafora, Anthony, "Google Ads Abused by Hackers for Major Cryptocurrency Heist", Retrieved from: https://www.techradar.com/in/news/google-ads-abused-by-hackers-to-steal-hundreds-of-thousands-in-cryptocurrency, Nov. 5, 2021, 2 Pages.

Wang, et al., "AI-driven Adaptive Protection against Human-operated Ransomware", Retrieved from: https://www.microsoft.com/security/blog/2021/11/15/ai-driven-adaptive-protection-against-human-operated-ransomware/?msclkid=28b48172af3d11ecacf2e5166e7d5a12, Nov. 15, 2021, 12 Pages.

* cited by examiner

AUTOMATED MANAGEMENT OF BLOCKCHAIN KNOWLEDGE REPOSITORIES

TECHNICAL FIELD

The present disclosure pertains generally to blockchain technology and, in particular, to methods of managing blockchain knowledge repositories, and to computer programs and systems for implementing the same.

BACKGROUND

Blockchain is becoming an increasing relevant technology in the modern world. A blockchain is a form of data structure that is typically maintained in a distributed blockchain network without any central authority or management; rather, decisions pertaining to the management of the blockchain are taken by consensus within the network. Transactions submitted to a blockchain network are validated and recorded in the blockchain in accordance with its underlying blockchain protocol. A blockchain network can be operated according to various protocols (e.g., 'unspent transaction output' or 'UTXO', account-based etc.) with a variety of consensus mechanisms (e.g. proof of work, proof of stake etc.). A blockchain 'wallet' generally refers to an address used to identify recipients within the blockchain. The precise meaning of the term depends on the specifics of the blockchain network and protocol. For example, in certain UTXO models, each transaction has one or more inputs and one or more outputs, where each output is associated with a quantity of digital asset (such as cryptocurrency) and a 'locking script' specifying a condition under which that output may be unlocked or 'spent'. The locking script typically includes a public key (but is not generally required to do so). A transaction is said to 'spend' an output of another transaction when it references that output in one of its own input fields, and is successfully recorded to the blockchain (implying the transaction is valid and satisfies the unlocking condition; this typically requires a transaction signature that is valid in respect of the specified public key, which in turn can only be generated by the owner of the corresponding private key). A 'wallet address' in this context may take the form of a public key or, more typically, a hash of a public key, or more generally an identifier of a recipient. A quantity of digital asset is said to be 'transferred' to a recipient in recording a transaction with an output that is spendable by the entity in possession of the required private key (or, more generally, the entity or entities who has or have the ability to satisfy the output's unlocking condition). In an account-based model, a wallet address generally refers to an address of an account recorded in the blockchain. In some account-based models, an account is created by submitting a valid transaction with a unique account address (the wallet address in this example case) that has not yet been used on the blockchain. The account includes a balance, and subsequent transactions can transfer specified quantities of digital asset to/from this account from/to another account(s) on the blockchain. Typically, an account is associated with a private key, and only the entity in possession of the corresponding private key has control over the account (in that a transaction signature generated with this key is required to effect a digital asset transfer from that account to another account). A recipient can be any entity that can engage in blockchain transaction, such as a person, organization, automated system, software agent etc. For example, certain blockchain protocols allows autonomous software agents (sometimes known as 'smart contracts') to be recorded, e.g. in the form of code contained in a blockchain transaction that may be executed as part of a transaction validation process. A wallet address may, for example, identify a smart contract account recorded in an account-based blockchain.

Certain forms of blockchain are anonymous, in that users are identified solely by wallet addresses. In order to effect a transfer of digital asset from one user to another, the former generally need only know a wallet address for the latter. From certain perspectives, anonymity is seen as a desirable attribute of blockchain systems. However, in other respects, it can be seen as a drawback, particularly the anonymity can create new opportunities for malicious actors. A public blockchain may be anonymous but it may also be open, in that every transaction may be available to the world in plain text. With such public blockchains, any user is free to search through the entire transaction history recorded in the blockchain. A variety of blockchain search engine tools are currently available to conduct structured blockchain searches.

SUMMARY

Even if a blockchain is anonymous in the above sense, it is also highly structured. In particular, blockchain wallet addresses (even if they are anonymous within the blockchain network) are readily identifiable (as they generally have a prescribed format for a given blockchain) and can be used to trace potentially long and complex transaction histories though a given blockchain. In various examples herein, blockchain wallet addresses are used as a way to infer links between blockchain-related content existing outside of the blockchain network infrastructure, and thus build and grow a structured (and potentially large) blockchain knowledge repository, in an automated manner, starting, e.g. from only a 'seed' knowledge element or a relatively small number of seed knowledge elements (the seed). The seed defines (at least in part) a target blockchain context. The target blockchain context need not be explicitly defined, but can be implicitly defined through a choice of appropriate seed element or elements. This approach can be used to mitigate issues such an anonymity, by linking wallet addresses to external knowledge in a systematic way. One or more examples may utilize blockchain search tools to further extend the scope of the search, which may allow an even more comprehensive knowledge repository to be grown from a given seed.

One example application is cybersecurity, where the techniques may be used, for example, to identify blockchain addresses and blockchain-related content associated with malicious actors, and take steps to protect users against those malicious actors. In such applications, the knowledge repository may be provided to a security agent (e.g. endpoint or cloud agents) so that it can take appropriate threat detection/remediation steps (such as alerting users to potential threats, blocking malicious blockchain-related content, blocking transfers to malicious wallet addresses etc.). Security agents may, for example, include antivirus (AV) agents/engines, malware detectors, URL/content-blockers, security appliances (including cloud-based) etc. However, the described techniques are not limited to cybersecurity and other applications are envisaged. In one or more example applications, the techniques may be used to implement a structured content search tool, e.g. to locate and output at a user interface content pertaining to a target blockchain context. More generally, the techniques can be applied to many different applications and/or in a variety of technological fields.

According to a first example aspect herein, a first content item is received. First metadata from the first content item; detecting a match between the first metadata and at least one predetermined metadata element in a knowledge repository pertaining to a target blockchain context; determining a first blockchain wallet address associated with the first content item; locating a second content item based on the first blockchain wallet address; extracting second metadata from the second content item; and updating the knowledge repository based on the second metadata extracted from the second content item.

In the first example aspect, a 'seed' is provided (at least in part) by the initial metadata data item(s) in the knowledge database. The seed may, for example, take the form of keyword or small number of keywords (and/or other metadata element(s)) targeted on the desired blockchain context. That initial seed may, in turn, be used to identify a first content item relevant to the target blockchain context (e.g. a known blockchain-related cyberthreat). A blockchain address associated with the first content item may be identified, and used in turn to identify a second content item that is (directly or indirectly) related to the same wallet address. This second content item, in turn, is a further source of knowledge about the target blockchain context, and can be used to develop, refine or otherwise update the knowledge repository pertaining to that context.

In a second example aspect, a first content item is received. A first blockchain wallet address associated with the first content item is determined. A match is detected between the first blockchain wallet address and a blockchain address database. First metadata is extracted from the first content item. A second content item is received. Second metadata is extracted from the second content item. A match is detected between the first metadata of the first content item and the second metadata of the second content item. A second blockchain wallet address associated with the second content item is determined. The second blockchain wallet address in the blockchain address database.

In the second example aspect, a 'seed' is provided (at least in part) by the first blockchain wallet address, which defines (at least in part) the target blockchain context. Having matched a first content item to this address, metadata extracted from the first content item can be matched to a further content item, which in turn might reveal a second blockchain wallet address relevant to the target context.

BRIEF DESCRIPTION OF FIGURES

Particular embodiments will now be described, by way of example only, with reference to the following schematic figures, in which.

DETAILED DESCRIPTION

Cybersecurity is an example context considered herein. Blockchain is increasingly used as a tool by malicious actors, and blockchain-related cyberthreats are thus increasingly common. For example, in a fraudulent crypto-campaign, users are incentivised to transfer cryptocurrency to a specified wallet address. For example, the address might be advertised on a social media or video-sharing platform (with some reward promised in return). Another example is a ransomware attack, in which a malicious software agent infiltrates a user's computer device, encrypts its stored data, and outputs a set of instructions to transfer an amount of cryptocurrency to a specified wallet address in order to unlock the device.

Techniques are described which can build and grow knowledge repositories pertaining to blockchain-related cyberthreats in an automated manner, leveraging the properties of blockchain. Such knowledge repositories can, in turn, can be deployed to security agents (e.g. endpoint or cloud-based) to detect signs of such scams. For example, an agent might generate an alert to alert a user to a cryptocurrency scam (one form of threat detection) and/or to block access to certain content or prevent a cryptocurrency transfer (examples of threat remediation). As an example, a security agent might take steps to block access to a user's hardware or software wallet (here the term 'wallet' is used in a different sense, to refer to a secure data store containing a user's private key(s)) when it detects telemetry indicative of a blockchain-related cyberthreat).

Example applications include cross-correlation of phishing message(s) and/or other content item(s), cryptocurrency wallet(s), and malicious actor(s), with the cross-correlated information being fed back to detection/mitigation system(s). Such techniques may be used to detect phishing or other malicious actions associated with cryptocurrency, such as ransomware or a fake "giveaway" of cryptocurrency. Multiple sources of content are evaluated, including blockchain(s) and cryptocurrency wallet information to detect other cryptocurrency wallet(s) of an identified malicious actor, and detect other phishing message(s) and/or content item(s) and/or malicious actions and/or actors associated with cryptocurrency wallet. The combined information can, in turn, be used to prevent/mitigate phishing link(s)/action(s) using automated threat detection/mitigation system(s).

Figure 1:
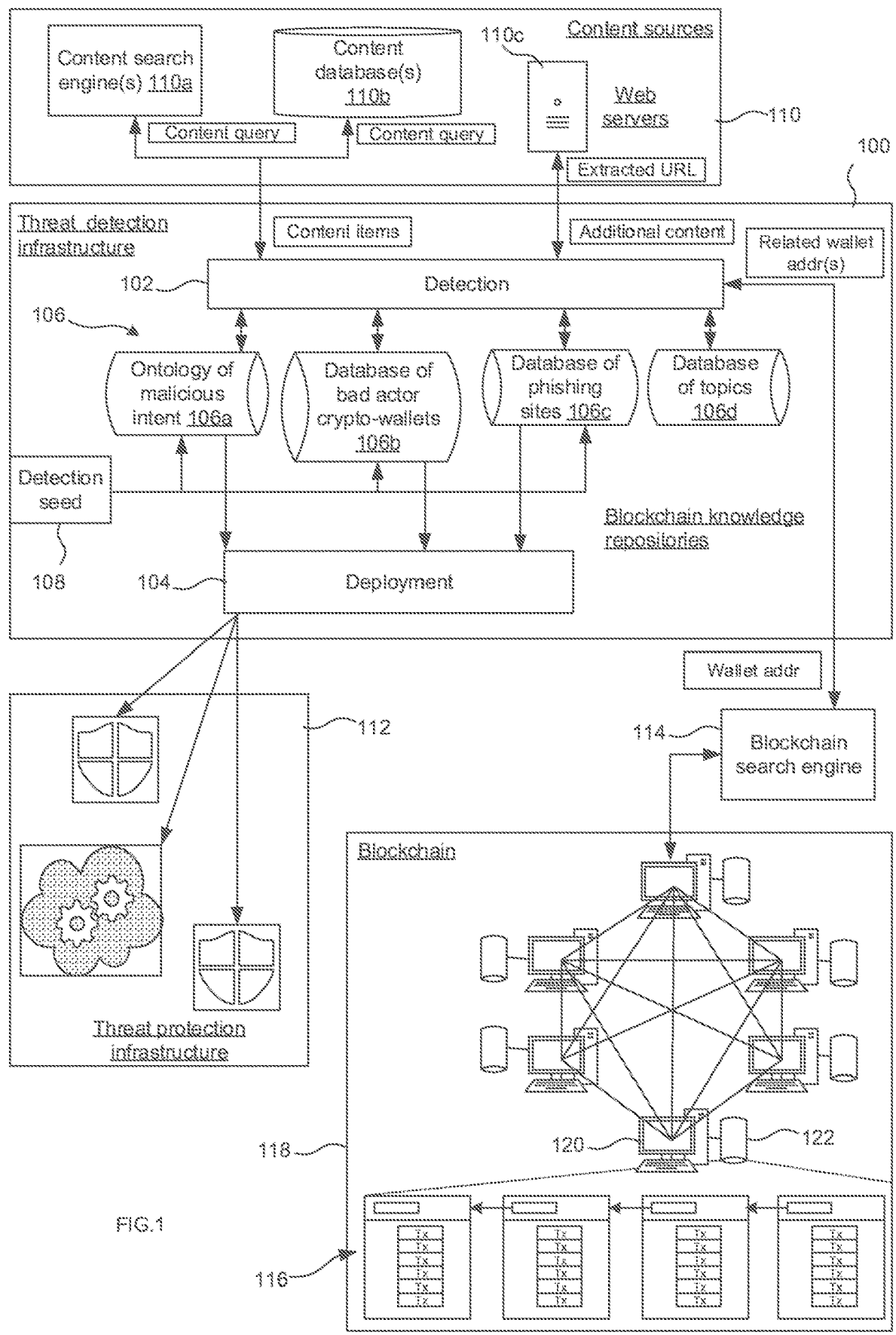
FIG. 1 show a block diagram of a system incorporating threat detection infrastructure.

FIG. 1 shows a schematic function block diagram of a threat detection system 100, which in turn is shown to comprise a detection component 102 (such as a detection system) and a deployment component 104 (such as a deployment system).

A set of structured knowledge repositories or databases (DB) 106 is maintained in the threat detection system 100, including an ontology of malicious intent (OMI) 106a, a wallet DB 106b (DW) containing wallet addresses identified as malicious, a website DB 106c (DP) containing addresses of websites identified as malicious (such as 'phishing' sites), and a topics DB 106d (DT) containing keywords and/or other metadata elements pertaining to one or more blockchain 'topics' (such as themes, individuals etc.).

The topics DB 106d allows blockchain-related content (which may or may not be malicious) to be identified. The OMI 106a encapsulates knowledge used to identify malicious content.

A 'detection seed' 108 refers to an initial set of data (one or more data elements or 'seed elements') used to populate the knowledge repository 106 and 'bootstrap' a detection process. For example, the seed 108 might include an initial set of one or more keywords and/or one or more other metadata items stored in the OMI 106a, and used initially to identify malicious content. Alternatively or additionally, the seed 108 might include one or more blockchain wallet addresses known to be malicious (e.g. having known ransomware or fake giveaway associations) that are stored in the wallet DB 106b. Alternatively or additionally, the seed 108 may include one or more web addresses of known malicious website(s) stored in the website DB 106c. The foregoing examples pertain to one or more blockchain-related cybersecurity contexts (such as crypto scams). More generally, the seed 108 defines a target blockchain context. The target blockchain context need not be explicitly defined or coded, because it can be defined implicitly though careful choice or selection of the one or more seed elements. From this initial seed 108, a structured knowledge repository (or repositories) may be grown via a structured and systematic self-learning process described herein.

Content items are received by the detection component 102 from a set of one or more content sources 110. For example, the set of content sources 110 may comprise one or more content search engines 110a (e.g. associated with a social media platform and/or a video/media sharing platform, such as audio, video, images, extracted text such as text transcripts), one or more content databases 110b (e.g. in which known ransomware messages, collected in a secure manner, are stored), and/or one or more web servers 110c (from which web content may be retrieved based on a web address). The following examples consider all three types of content source, but the techniques can be implemented with fewer content sources or a single content source.

A set of cybersecurity (threat protection) infrastructure 102 includes one or more security agents, operable to perform threat detection and/or remediation. Such agents can take the form of endpoint agents, executed on an endpoint device (such as a user device or server device), cloud-based agents etc., or more generally any software or hardware (e.g. device, system etc.) entity implementing threat detection and remediation. The deployment component 104 is responsible for deploying information from the knowledge repositories 106 to the cybersecurity infrastructure 112 for use in threat detection/remediation. Note, the term 'detection' may be used in two senses herein. The detection component 102 uses a self-learning process to detect/identify malicious content, wallet addresses, URLs etc. and/or to identify one or more other entities as malicious (e.g. via back-end processing), whereas a threat detection agent may detect e.g. access to (and/or another form of interaction with) some malicious entity (typically already known to be malicious at that point). Thus, in certain contexts, the term detection may, for example, refer to a process of detecting/identifying an entity as malicious, and in other contexts, may refer to the process of detecting an interaction with an entity already known to be malicious (also referred to as monitoring). The meaning shall be clear in the context in which the term is used. Monitoring (detection in the second sense) might be coupled with some alert mechanism, to alert a user to a potential cyberthreat. 'Remediation' generally refers to a similar detection mechanism, coupled with some automated response mechanism (such as automatically blocking access to a malicious URL, automatically blocking a transaction with a malicious wallet address, preventing or terminating execution of malicious software etc.).

A blockchain search engine 114 is shown accessible to the detection component 102. The detection component 102 can submit a query containing a blockchain wallet address to the blockchain search engine 114, and the latter searches a blockchain 116 accessible to it (for example, a public blockchain accessible to anyone) for one or more related wallet address(es). A single blockchain 116 is shown, but the block chain search engine 114 may have the ability to search multiple blockchains, and/or multiple blockchain search engines may be used. For example, multiple blockchains with different blockchain protocols (or cryptocurrency units) may be searched, such as BTC, ETH, DOGE, LTC etc. A related wallet address typically means a wallet address having a transaction relationship to the given wallet address recorded within the blockchain 116. The blockchain search engine 114 may for example be an external 'third-party' system providing blockchain search capabilities, or an internal system providing such capability.

The blockchain 116 is a distributed data structure maintained by a blockchain network 118. Typically, each node 120 in the blockchain network 118 stores its own local copy 122 of the blockchain 116, and the network operates on a consensus protocol to agree an authoritative state of the blockchain 116. The blockchain records transactions (Tx) submitted to and validated within the blockchain network 118, in accordance with the network's underlying protocol (e.g. UTXO, account-based etc.) and consensus mechanism (e.g. proof-of-work, proof-of-stake etc.). Over time, the blockchain 116 grows, as nodes within the blockchain network 118 (or 'miners') form a consensus on new blocks added to the blockchain 116 (the process of block 'mining'). A transaction recorded in the blockchain 116 generally has some transactional relationship to another transaction recorded in the blockchain 116 (e.g. in the same block and/or another block(s)). For example, a first UTXO transaction may have a transactional relationship to a second UTXO transaction, in that the first UTXO transaction spends an output of the second UTXO transaction (in the sense of satisfying an unlocking condition of that output), or has an output that is spent by the second UTXO transaction (in the same sense). In such cases, a first wallet addresses associated with the first UTXO transaction may have a transactional relationship with a second wallet address of the second UTXO transaction, by virtue of the spending relationship between those transactions. As another example, in an account-based blockchain, a transaction may effect a digital asset transfer from a first account on the blockchain 116 (e.g., a user account, smart contract account etc.) to a second account on the blockchain 116 (e.g., a user account, smart contract account etc.), thus creating a transactional relationship between respective wallet addresses of the first and second accounts.

The operations of the detection component 102 are described in detail below. First, some example processing flows are summarized for ease of illustration.

First, a situation is considered in which the detection set 108 includes an initial set of key word(s) (and/or other metadata item(s)) contained in the OMI 106a. The following description refers to keyword(s) by way of example. However, the description applies equally to other form(s) of metadata. The present example considers keywords known to be associated with a given blockchain context, such as a ransomware attack or phishing campaign. The detection component 102 can use those keywords to search the content sources 110 for content items matching individual keyworks or particular combinations of keywords. Alternatively or additionally, the topic DB 106d can be used to search for content items that are generally blockchain-related, and the OMI 106a can be used to identify a subset of potentially malicious content item(s) within those content items.

Having identified a content item as malicious, by matching the content item to one or more keywords in the OMI 106, the detection component 102 can identify and extract a blockchain wallet address contained in the content item or otherwise associated with it (e.g. contained in a web page referenced in the content item). Because that wallet address is associated with a malicious content item, it may be assumed to be malicious. Steps may be taken to prevent wallet addresses from being falsely identified as malicious, for example cross-referencing against one or more databases of benign wallet addresses, e.g. known to be associated with legitimate entities. If the wallet address is not recognized as benign, it may be assumed to be malicious, and be stored in the wallet DB 106b.

The malicious wallet address stored in the wallet DB 106b can, in turn, be used to search for further content items associated with the malicious wallet address. This search is two-fold. The malicious wallet address is used to perform a further search of the content sources 110, for further content items directly associated with the malicious wallet address. In addition, the malicious wallet address is provided to the blockchain search engine 114 to identify any related wallet address(es) (in the sense described above). Again, steps may be taken to exclude related wallet addresses that are known to be benign at this point; otherwise, a wallet address related to a malicious wallet address may be assumed to be, itself, malicious by virtue of that relationship. Any wallet address related to the original malicious wallet address can, in turn, be used to perform yet more searching of the content sources 110, for content items directly associated with the related wallet address (and thus indirectly associated with the original malicious wallet address), and so on.

Content items found in the further search are also assumed to be malicious, by virtue of their association with a malicious wallet address. Hence, metadata extracted from those further content items can be added to the OMI 106a, which in turn can be used to locate further malicious content items.

As will be apparent, this process can continue, in an ongoing feedback loop, growing the OMI 106a and wallet DB 106b over time from only a small set of seed data.

In addition, websites referenced in malicious content items can be added to the website DB 106c, and 'scraped' for content, which is processed in the same way as the content items themselves (again, websites known to be benign, e.g. though cross-referencing with a database of benign websites, may be excluded).

As another example, consider a detection seed 108 that includes a known malicious wallet address in the wallet DB 106b. In this case, the feedback loop is essentially the same, but might start from a different point: a content item might be initially identified as malicious based on an association with the known malicious wallet address, and metadata extracted from the content item can thus be added to the OMI 106a. The updated OMI 106a can, in turn, be used to detect a further malicious content item(s), and thereafter the detection process proceeds in the manner described above (having been initially bootstrapped by the known malicious wallet address).

One application uses the techniques to monitor and mitigate campaigns that use interest in and anonymity provided by cryptocurrency. Once a signal indicative of a blockchain-related cyber threat has been obtained, it is possible to uncover malicious actors' cryptocurrency wallets (also referred to as blockchain wallets or crypto wallets), identify phishing sites, identify compromised social media accounts, identify viral topics (V) used to scam victims, and/or widen a known vocabulary (or other form of OMI) to identify malicious intent A combination of text/image/media analysis may be used to extract relevant indicators and unique identifiers to build a catalogue of terminology/phrases that is used to seed a search for more of such indicators. The kind of information extracted may include but is not limited to crypto-wallets, scammer-site-URLs/URIs, trending keywords/phrases/topics etc. The information derived from these sources is used to determine a confidence measure for the indicator being suitable for detection of blockchain-related cyberthreats, as well as to prevent unsuspecting users from falling prey to these attempts. Computing the confidence score may, for example, include cross-referencing with databases of wallet addresses, web addresses and/or other entities know to be benign. For example, a confidence score may be assigned to a wallet address, web address or other indicator that is cross-referenced with a malicious entity (or entities) based on a reputation score associated with the (or each) entity.

The techniques provide the ability to quickly identify newly trending threats by exposing hard to index, detect and/or parse information and issue protection against them by utilizing capabilities of appropriate security systems.

The automated system continually issues protection by connecting disparate entities (e.g. viral topics, crypto wallets, phishing messages and blockchain transactions) together forming a self-perpetuating graph of nodes. Each node feeds back a signal, which when taken in aggregation, is indicative of malintent. Once identified, blockchain transactions are interrogated to expand the search to find other potential crypto-wallets, malicious actors or phishing targets. This is a self-learning approach utilizing a myriad of harvesting techniques such as optical character recognition (OCR), text analysis on different media (text, image, videos) etc. to increase the chances of discovery, while reducing avenues to circumvent detection. This makes the approach effective at detecting such threats, with minimal manual intervention post bootstrapping.

Figure 2:
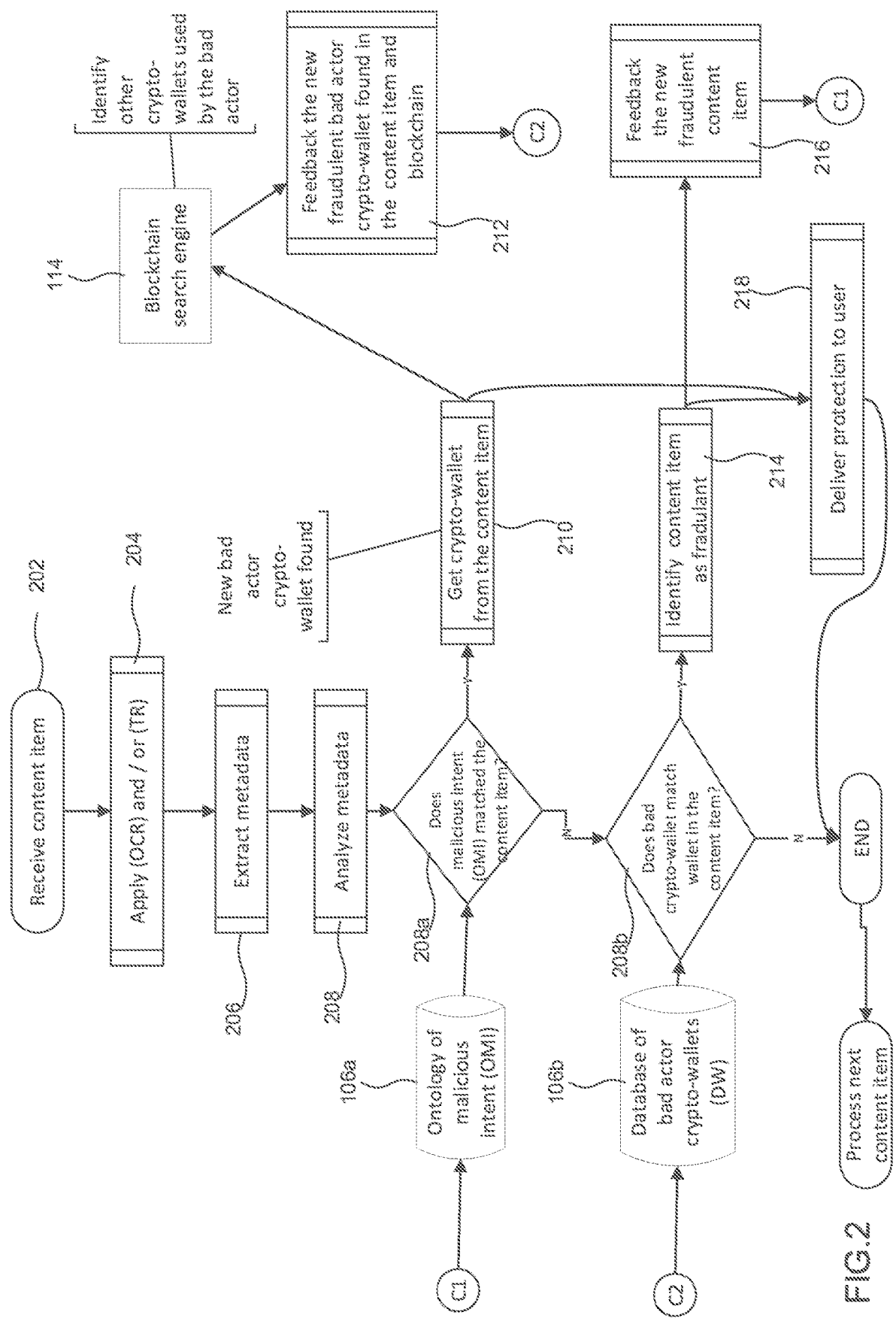
FIG. 2 shows a flowchart for a self-learning method of automated threat detection.

FIG. 2 shows a flow chart for a method of processing a content item in the detection system 100. The description refers to content and/or metadata extracted from a content item, noting that a content item could be obtained from a web address (e.g. URI) extracted from another content item a content item. The term message is used interchangeably with content item.

At step 202 a content item is received at the component 102. The content item may contain unstructured content, in which case processing (206) is applied to the content item in order to extract structured metadata therefrom. The processing 206 may be supported by pre-processing (204) such as optical character recognition (OCR) and/or topic recognition (TR) applied to the content item. The structured metadata is then analysed (208), and that analysis is two-fold. At step 208a, the structured metadata is compared with the OMI 106. If the metadata is found to match a metadata element(s) in the OMI 106a, the content item is classified as malicious. At step 208b, any blockchain wallet address associated with (e.g. contained or referenced in) the content item is compared with the wallet DB 106b. If the wallet address is found to match a wallet address in the wallet DB 106b, the content item is classified as malicious. Steps 208*a* and 208*b* are shown sequentially, but they may be performed in the opposite order, or in parallel.

Suppose the content item is found to be malicious at step 208*a*, and is associated with a wallet address. Subject to the caveats explained above, the wallet address can be assumed (210) to be malicious. The blockchain search engine 114 is used to locate any related wallet address(es), and the wallet address associated with the content item and any related wallet address(es) are added to the wallet DB 106*b* at step 212 for use in subsequent detections. Reference sign C2 denotes a feedback loop to the wallet DB 106*b*.

Now suppose the content item is instead found to be malicious at step 208*b*, because its associated wallet address has been matched to a wallet address in the wallet DB 106*b*. The content item is now identified (214) as fraudulent on that basis. Hence, at step 216, the metadata extracted from the content item is used to update the OMI 106*a*, e.g. with one or more additional keyword(s) and/or other metadata element(s) that can be used in subsequent detections. Reference sign C1 denotes a feedback loop to the OMI 106*a*.

Step 218 is performed by the deployment component 104. Once a content item has been identified as malicious, and used to update either the OMI 106*a* or the wallet DB 106*b*, the information added to the OMI 106*a* or wallet DB 106*b* can be deployed to the threat protection infrastructure 112. This can be a 'per-content item' update (and update is sent every time a new content item is identified as malicious, to communicate the newly-gained knowledge), or a batch process (e.g. performed every few seconds, minutes, hours etc.).

Figure 3:
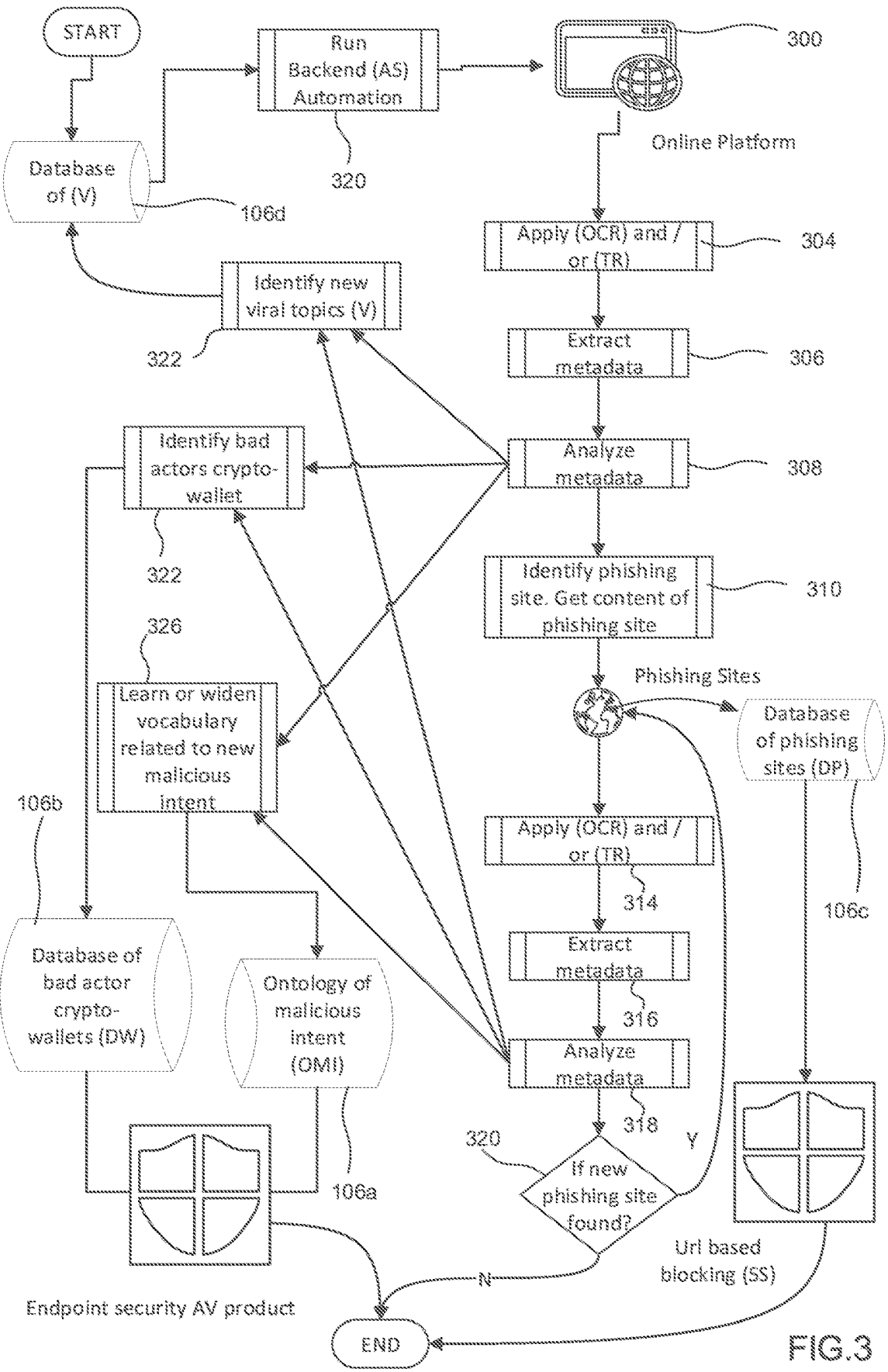
FIG. 3 shows further details of a self-learning method.

FIG. 3 shows a method of processing content obtained from an online platform 300, such as a social media platform, media-sharing platform etc. Steps 304, 306, 308 correspond to steps 204, 206, 208 in FIG. 2, and are applied to each content item obtained from the online platform 300. Thus, web content obtained in this manner is processed in essentially the same manner, as one or more additional content items received at the detection component 102.

The topic database 106*d* is used to search the platform 300 for content items that are generally blockchain-related (but not necessarily malicious). This search can be performed by a back end automation process (step 320).

At step 310, having a malicious content item (based on keywords/metadata compared with the OMI 106*a* or a wallet address matched to the wallet DB 106*b*), a URI (or URIs) contained in the content item may be used to obtain content from the corresponding website. This website is assumed to be a phishing website (subject to the caveats above), and its content processed in exactly the same way as the content item itself (at steps 314, 316, 318 corresponding to steps 304, 306, 308).

The web content may itself reference a further website, and if it is determined to do so (step 320), steps 314-318 are repeated for the further web content (processed as one or more further content items received at the detection system 102).

In addition to updating the OMI 106*a* at step 326 (corresponding to step 216 in FIG. 2) or the wallet DB 106*b* at step 322 (corresponding to step 212), the topic DB 106*d* may also be updated with new indications of blockchain-related topics obtained from the metadata alanyls at step 308 and/or step 318. The website DB 106*c* is also updated with the address(es) of any newly located phishing websites and/or other web addresses identified as malicious.

The updated wallet DB 106*b*, the OMI 106*a* and the website database 106*c* can all be deployed to the threat protection infrastructure 112. For example, the website database 106*c* can be used by a web address-based blocking agent to block attempted access to websites identified in the database 106*c*.

Figure 4:
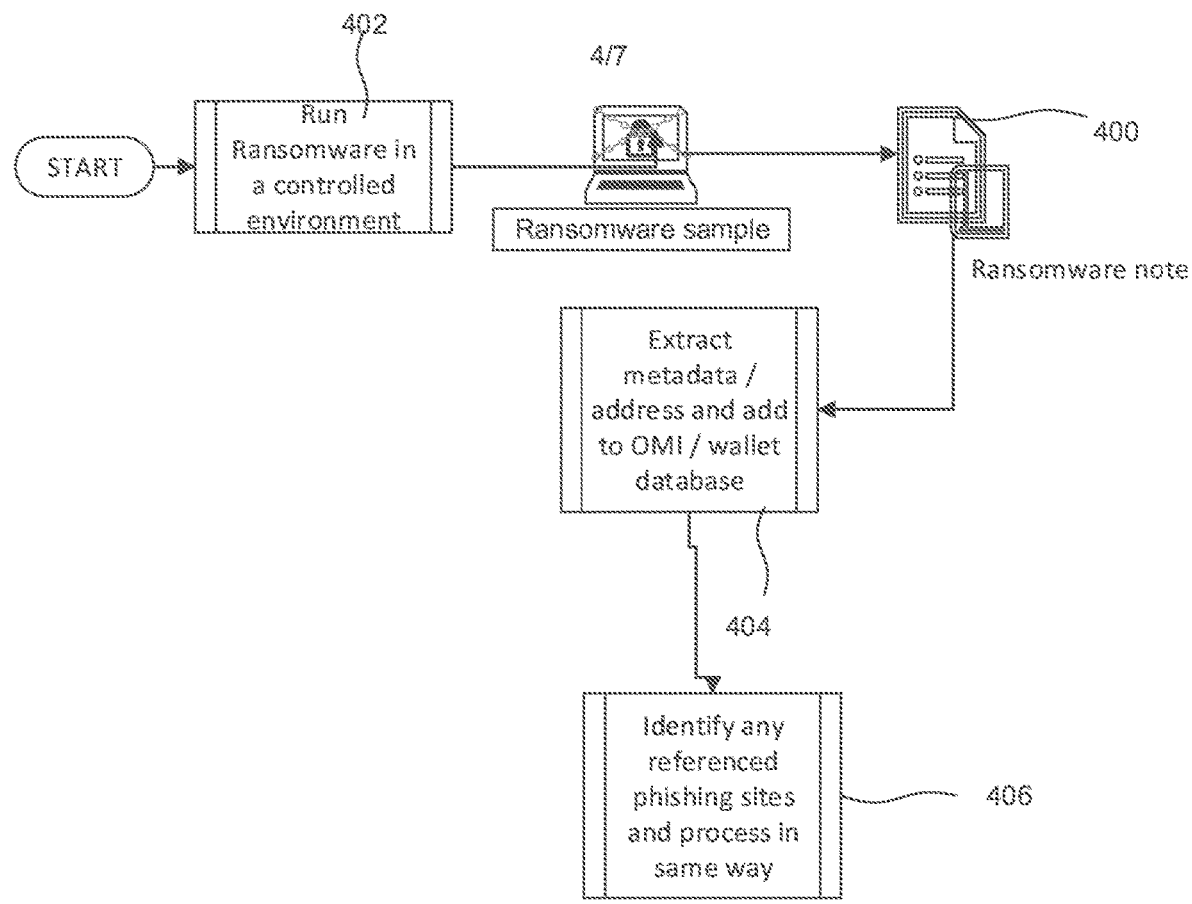
FIG. 4 shows a flow chart for a method of generating a detection seed from controlled execution of ransomware.

FIG. 4 shows a further example of a content item, in the form of a ransomware note, which is processed (404) as a content item in much the same manner as described above. The ransomware note can be obtained, for example, by running a known piece of ransomware in a secure and controlled environment. One difference is that the ransomware note can always be assumed to be malicious. Any metadata or blockchain address extracted from the ransomware note can therefore be immediately added to the OMI 106*a* or wallet database 106*b*. This is one way of obtaining the detection seed 108 (or a portion thereof) from a piece or pieces of content known to be malicious (such as a ransomware note obtained through controlled execution of ransomware).

Any phishing website(s) referenced in the ransomware note 400 are identified, and their content is processed, in the same manner as described above.

Figure 5:
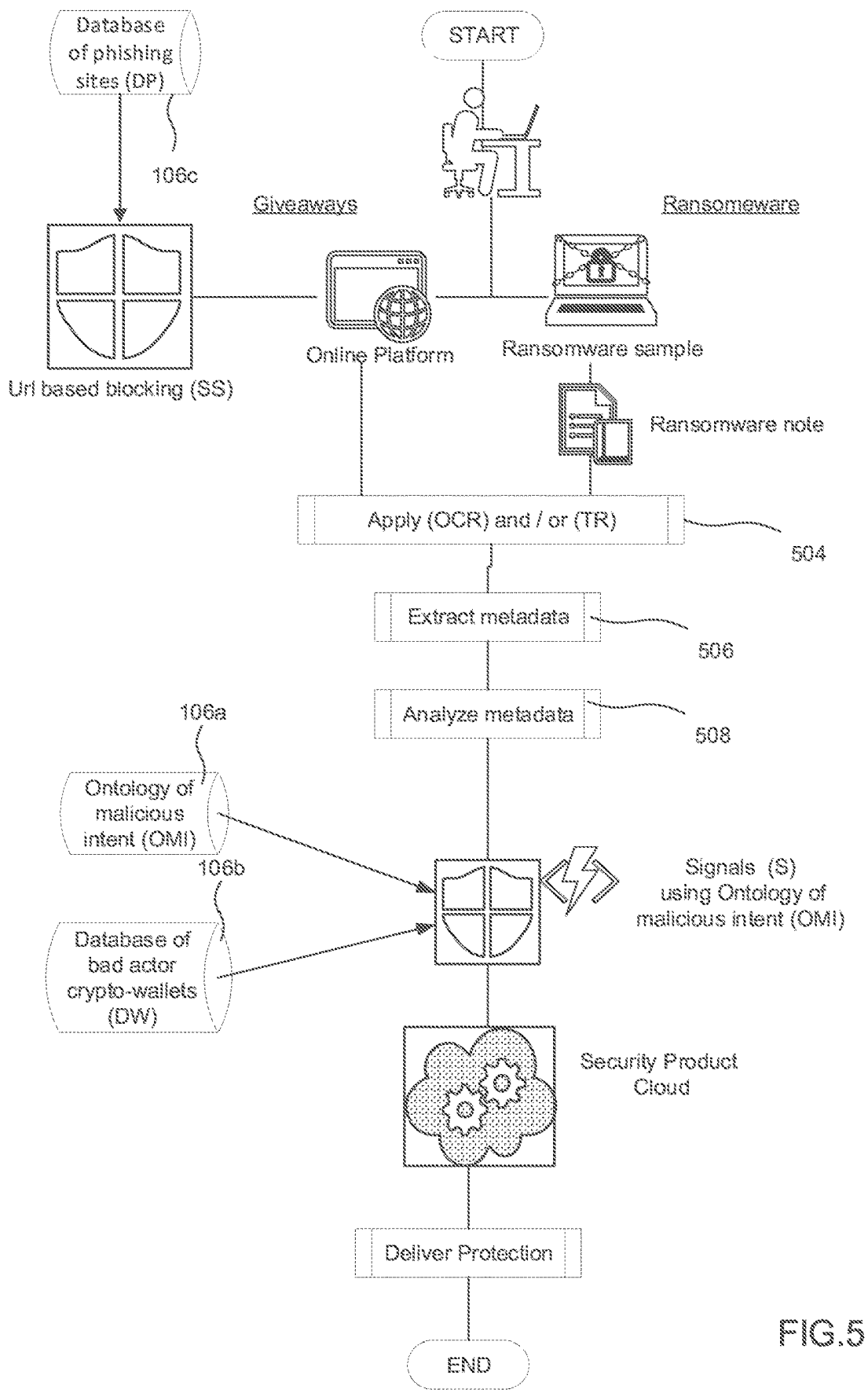
FIG. 5 shows a flow chart for a method of threat detection or remediation using one or more self-learned knowledge repositories.

FIG. 5 shows a method of threat detection or remediation performed by one or more security agents of the threat protection system 112 (note that the threat detection system 112 may, in fact, be made up of multiple subsystems, which may be interdependent or independent of each other). The (or each) security agent has access to the OMI 106*a* and the wallet DB 106*b* (or local or remote copies thereof). Steps 504, 506 and 508 are similar to steps 204, 206 and 208 performed in the detection stage, but here they are applied to 'live' content detected in a security monitoring context. Note, live refers generally to a detection and/or remediation context based on a known malicious entity (or entities). Live content includes e.g. a podcast, broadcast or other live media stream during an on-going giveaway, but more generally any content that is e.g. transmitted or received, or to which access is attempted in a security monitoring context. Such content could, for example, include online content which a user is attempting to access, or a ransom note generated by an uncontrolled piece of ransomware. The aforementioned steps are performed to extract metadata and/or blockchain addresses for comparison with the OMI 106*a* and/or the wallet DB 106*b*. In addition, URL-based blocking (SS) may be applied based on the website DB 106*c*.

Figure 6:
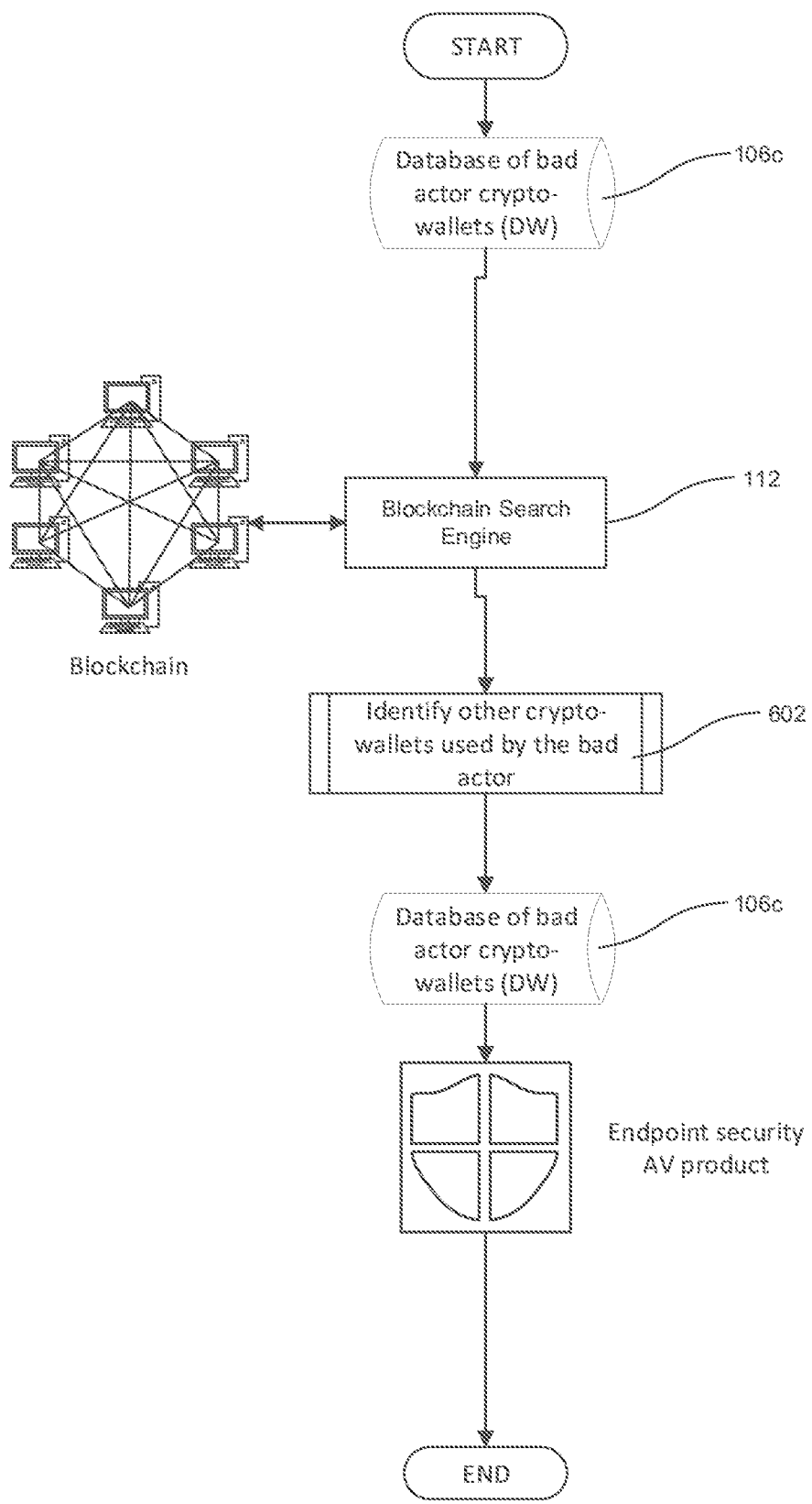
FIG. 6 shows a flow chart for a blockchain search method.

FIG. 6 shows a method of updating the wallet database based on a blockchain search. A search can be conducted (step 602), via the blockchain search engine 112, for any wallet address(es) having a transactional relationship to a wallet address stored in the wallet DB 106*b*. Any such related wallets (unless they can be excluded as benign) can be added to the wallet DB 106*c*, and deployed to the threat protection system 112 for live use. As described above, such tools are highly effective because of the highly structured nature of the blockchain 116, and the precise and well-defined nature of the transactional relationships recorded therein. A blockchain 116 is highly structured, with rigorous mechanisms to ensure validity and correctness of the data structured though the agreed consensus mechanism within the blockchain network 118. Here, this highly structured source of information is coupled with external seed knowledge to expand the self-learning process in a highly effective and reliable manner.

A specific algorithmic implementation is summarized below (at the level of pseudocode) for the purposes of illustration only (by way of example, the steps refer to a fake giveaway message or 'FGM'; however, the algorithmic steps below can be applied to any form of content item):

A. Automating Media Sites:
  1. Prepare keywords based on topics and individuals relevant to blockchain, e.g. viral individuals and/or other viral topics:
  2. Initialize a web browser instance to orchestrate text extraction from videos (and/or other media items) shared on a media sharing platform with a service application programming interface (API) or other search mechanism
  3. Using the service API iterate through keywords from step 1:
  4. Iterate through results:
     a. Select "live" videos longer than a predefined time window
     b. Load the video
     c. Wait for predefined period to let the video finish loading (account for ads)
     d. Screen grab from the video
     e. Run OCR
     f. Skip if no text is recognized; jump to future time period and repeat until beyond the end of video
     g. Query for text that conveys or used in fake giveaway videos e.g.:
        "to participate"
        "send" && ("get" or "receive")
        "contribution address"
        "participation"
        "giveaway"
     h. Extract URLs from the video transcript
     i. If URL is known to be benign (e.g. has a good reputation, high reputation score etc.), then skip
     j. Download a landing page of the URL from the video
     k. Where appropriate, query any suggested videos (suggested by the platform based on the selected video)
        i. Identify fake giveaway and/or other malicious videos with titles not already covered by existing keyword list (using same techniques as A.4.a-A.4.j)
        ii. Add newly found keywords to list of viral topics/individuals B. Processing Downloaded Landing Page of Fake Giveaway:
  1. Query file hash (e.g., sha256) of the landing pages
  2. Scan file using an AV engine to ensure coverage of a fake giveaway message (FGM) detector. If missing add as follows:
     a. Locate the content item in the landing pages
     b. Get phrases that conveys instructions or urgency
     c. Further refine the phrases
     d. Add AV signatures (a definition or detection logic to identify malicious or interesting contents or objects) for the found phrases to FGM
  3. The FGM message detector is based on short phrases or part of phrases. e.g.:
     hurry up take part
     during this unique event we will
     to participate you just need
     if you send ***** you will get *** back if you
  4. Inspect samples for new unrecognized cryptocurrency by a wallet signature (context script signature)
  5. Once found, add the new wallet characteristics to a wallet signature
  6. Extract wallet address by running wallet signature (context script signature)
     a. The wallet signature will search the landing page to find for wallet addresses using known characteristics of blockchain wallet addresses associated with different blockchain protocols (or cryptocurrency units) such as:
        i. BTC: starts with 1, 3 or bc1 with 26-78 characters
        ii. ETH: starts with 0x with 42 characters
        iii. ADA: starts with Ae2, DdzFF or addr1 with at least 26 characters
        iv. DOGE: starts with D, 2nd character is either a number or capital letter with 26-35 characters
        v. LTC: starts with L, M or ltc1 with 26-35 characters
  7. Use the blockchain search engine 114 to conduct a search on the extracted wallet addresses: refer to "E. Blockchain processing steps" below
  8. Create AV signatures for the extracted wallet addresses and related wallet addresses from "E. Blockchain processing steps"

C. Get New Wallet Addresses from Telemetry:
  1. Whenever the FGM or signatures-based wallet address matches a web page:
  2. The wallet signature will search the web page (steps of wallet signature have been covered in "B. Processing Downloaded landing page of fake giveaway" step 6)
  3. Add cryptocurrency unit and wallet address (or addresses) from previous step to telemetry channels (Refer to "D. Process telemetry").
  4. Attempt to procure samples
  5. If sample is received, process the sample using "B. Processing Downloaded landing page or fake giveaway". A landing page downloading tool may be used to obtain the landing page.

D. Process Telemetry:
  1. Extract wallet address from telemetry
  2. Run "E. Blockchain processing steps"
  3. Create AV signatures for the extracted wallet address and related wallet address from "E. Blockchain processing steps"

E. Blockchain Processing Steps:
  1. Verify that the extracted wallet address exists in the blockchain 116; else skip
  2. Identify other wallet address (or addresses) related to the extracted wallet address
     a. Following the transaction in the blockchain 116, different wallet addresses may be observed
     b. Get any next level wallet address/es—these are wallet/s from where the collected/stolen coins/tokens in the extracted wallet addresses is transferred to.
     c. Keep following the transactions in the blockchain by repeating step 2.b to get the succeeding next levels
  3. Add all newly identified wallet addresses from step 2 as an AV signature
  4. Group related wallet addresses based on transaction and/or the FGM associated to it.
  5. This indicates which campaign or what kind of malware/attack a user is seeing
  6. If the attack is a fake giveaway, blocking or avoiding the user from sending their coins/tokens to malicious actors is sufficient
  7. If it is a ransom note: The user could be infected or in the process of being infected by ransomware. Thus, full remediation step against ransomware may be performed.

Whilst cybersecurity applications are considered above, the techniques can be applied in other contexts. The context is defined by the initial seed 108; if keywords/metadata are chosen related to cybersecurity, the self-learning method will build the knowledge repositories around that context. Other contexts can be considered through a different choice of keywords. For example, in a search context, content items matching a knowledge repository may be outputted at a search user interface rendered on a display.

According to an aspect of the disclosure, there is provided a computer-implemented method which comprises receiving a first content item; extracting first metadata from the first content item; detecting a match between the first metadata and at least one predetermined metadata element in a knowledge repository pertaining to a target blockchain context; determining a first blockchain wallet address associated with the first content item, locating a second content item based on the first blockchain wallet address; extracting second metadata from the second content item; and updating the knowledge repository based on the second metadata extracted from the second content item.

In one example, the target blockchain context may be a known blockchain-related cyberthreat. The knowledge repository may be provided, as updated based on the second metadata, to a security agent operable to perform at least one of cyberthreat detection and cyberthreat remediation based thereon. The knowledge repository may be, for example, a malicious intent ontology.

In another example, at least one content source may be queried based on the first blockchain wallet address, and the second content item may be received from the at least one content source.

In another example, the first blockchain wallet address may be provided to a blockchain search engine. From the blockchain search engine, a second blockchain wallet address may be received, having a transactional relationship to the first blockchain wallet address recorded in a blockchain searchable by the blockchain search engine. At least one content source may be queried based on the second blockchain wallet address; and responsive to querying the at least one content source based on the second blockchain wallet address, the second content item may be received from the at least one content source. The first blockchain wallet address and the second blockchain wallet address may be stored in an address database. Similarly, from the at least one content source a third content item associated with the first blockchain wallet address may be received. Third metadata from the third content item may be extracted. The knowledge database may be updated based on the third metadata extracted from the third content item.

In another example, a third content item may be received. Third metadata may be extracted from the third content item. A match between the third metadata and the knowledge database, as updated based on the second metadata, may be detected. A user interface associated with a computer device may be used to output the third content item responsive to detecting the match between the third metadata and the knowledge database. A third blockchain wallet address associated with the third content item may be determined. Based on the third blockchain wallet address a fourth content item related to the third blockchain wallet address may be located. Fourth metadata from the fourth content item may be extracted. The knowledge database may be updated based on the fourth metadata extracted from the fourth content item.

In another example, a first web address may be extracted from the first content item. From a first web server, first web content associated with the first web address may be obtained, wherein the first blockchain wallet address may be extracted from the first web content.

In another example, a second web address may be extracted from the second content item. From a second web server, second web content associated with the second web address may be obtained, wherein the knowledge repository may be updated based on the second web content. The second web address may be stored in a web address database accessible to a security agent executed on a computer device, wherein the security agent may be operable to block access to web addresses stored in the web address database.

According to an aspect of the disclosure, there is provided a computer system comprising at least one memory embodying computer-readable instructions; and at least one processor coupled to the at least one memory and configured to execute the computer-readable instructions, the computer-readable instructions being configured, upon execution by the at least one processor, to cause the processor to receive a first content item; determine a first blockchain wallet address associated with the first content item; detect a match between the first blockchain wallet address and a blockchain address database; extract first metadata from the first content item; receive a second content item; extract second metadata from the second content item; detect a match between the first metadata of the first content item and the second metadata of the second content item; determine a second blockchain wallet address associated with the second content item; and store the second blockchain wallet address in the blockchain address database.

In one example, the blockchain address database may be initially populated with at least one blockchain wallet address associated with a known blockchain-related cyberthreat; wherein the blockchain address database containing the second blockchain wallet address may be rendered accessible to a security agent operable to perform at least one of cyberthreat detection and cyberthreat remediation based thereon.

In another example, the second blockchain wallet address may be extracted from the second content item or extracted from web content obtained using a web address extracted from the second content item.

In another example, the second blockchain wallet address may be obtained from a blockchain search engine, after the identification of a transactional relationship to a second blockchain web address extracted from the second content item or from web content addressed in the second content item.

In another example, the computer-readable instructions may be configured to cause the processor to receive a third content item; determine a third blockchain wallet address associated with the first content item; and detect a match between the third blockchain wallet address and the second blockchain wallet address stored in the blockchain address database.

In another example, the computer-readable instructions may be configured to cause the processor to cause a user interface associated with a computer device to output the third content item responsive to detecting the match between the third blockchain wallet address and the second blockchain wallet address.

According to an aspect of the disclosure, there is provided a computer storage medium embodying computer-readable instructions configured, when executed on at least one computer processor, to cause the at least one computer processor to receive a first content item; extract first metadata from the first content item; detect a match between the first metadata and at least one predetermined metadata element in a knowledge repository pertaining to a target blockchain context; determine a first blockchain wallet address associated with the first content item; locate a second content item based on the first blockchain wallet address; extract second metadata from the second content item; and update the knowledge repository based on the second metadata extracted from the second content item.

Figure 7:
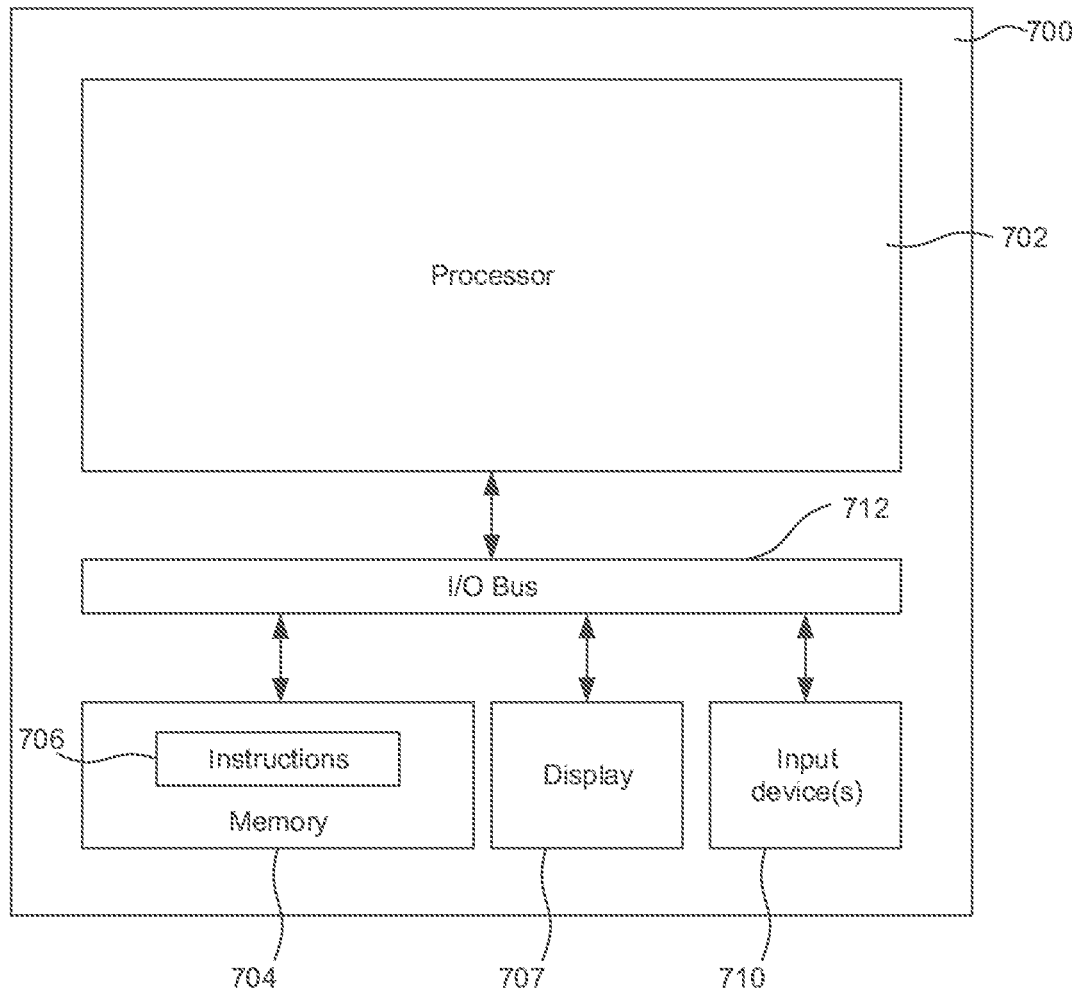
FIG. 7 shows a schematic block diagram of a computer system.

FIG. 7 shows computing equipment 700, which in turn is shown to comprise a processor (or processors 702), a memory (or memories) 704, a display 706 and/or other output device(s), one or more input devices 710. The memory 706 is shown storing computer-readable instructions 706 embodying one or more computer programs for execution on the processor 702. The memory 704, display 706 and input device(s) 710 are shown coupled to the processor 702 via an input/output (IO) bus (or multiple IO buses). The computing equipment 700 may take the form of a single computing device or multiple computing devices in a distributed computing arrangement (e.g. client-server architecture). It will be understood that processor 702 (or processors) may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in non-transitory memory and executable by the processor, or by hardware, or by a combination of tangibly stored software and hardware (and tangibly stored firmware). Some aspects of the embodiments described herein with reference to the drawings comprise computer processes performed in processing systems or processors. Some aspects also extend to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. In some examples, computer executable instructions are provided using any computer-readable media that are accessible by the computing equipment 700. Computer-readable media include, for example, computer storage media such as memory 704 and communications media. Computer storage media include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage the memory 702 is shown within the computing equipment 700, it will be appreciated by a person skilled in the art, that, in some examples, the storage is distributed or located remotely and accessed via a network or other communication link (e.g., using a communication interface). The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A computer-implemented method comprising:
receiving a first content item;
extracting first metadata from the first content item;
detecting a match between the first metadata and at least one predetermined metadata element in a knowledge repository pertaining to a target blockchain context;
determining a first blockchain wallet address associated with the first content item;
providing the first blockchain wallet address to a blockchain search engine;
receiving from the blockchain search engine a second blockchain wallet address having a transactional relationship to the first blockchain wallet address recorded in a blockchain searchable by the blockchain search engine;
querying at least one content source based on the second blockchain wallet address;
responsive to querying the at least one content source based on the second blockchain wallet address, receiving the second content item from the at least one content source;
extracting second metadata from the second content item; and
updating the knowledge repository based on the second metadata extracted from the second content item.

2. The method of claim 1, wherein the target blockchain context is a known blockchain-related cyberthreat, wherein the method comprises:
providing the knowledge repository, as updated based on the second metadata, to a security agent operable to perform at least one of cyberthreat detection and cyberthreat remediation based thereon.

3. The method of claim 2, wherein the knowledge repository is a malicious intent ontology.

4. The method of claim 1, comprising:
storing the first blockchain wallet address in an address database, wherein the second content item is located based on the first blockchain wallet address stored in the address database; and
storing the second blockchain wallet address in the address database.

5. The method of claim 1, comprising:
querying the at least one content source based on the first blockchain wallet address;

receiving from the at least one content source a third content item associated with the first blockchain wallet address;
extracting third metadata from the third content item; and
updating the knowledge database based on the third metadata extracted from the third content item.

6. The method of claim 1, comprising:
receiving a third content item;
extracting third metadata from the third content item;
detecting a match between the third metadata and the knowledge database as updated based on the second metadata.

7. The method of claim 6, comprising:
determining a third blockchain wallet address associated with the third content item;
locating based on the third blockchain wallet address a fourth content item related to the third blockchain wallet address;
extracting fourth metadata from the fourth content item; and
updating the knowledge database based on the fourth metadata extracted from the fourth content item.

8. The method of claim 6, comprising:
causing a user interface associated with a computer device to output the third content item responsive to detecting the match between the third metadata and the knowledge database.

9. The method of claim 1, comprising:
extracting a first web address from the first content item; and
obtaining, from a first web server, first web content associated with the first web address, wherein the first blockchain wallet address is extracted from the first web content.

10. The method of claim 1, comprising:
extracting a second web address from the second content item; and
obtaining, from a second web server, second web content associated with the second web address, wherein the knowledge repository is updated based on the second web content.

11. The method of claim 10, comprising:
storing the second web address in a web address database accessible to a security agent executed on a computer device, wherein the security agent operated to block access to web addresses stored in the web address database.

12. A computer storage medium embodying computer-readable instructions configured, when executed on at least one computer processor, to cause the at least one computer processor to:
receive a first content item;
extract first metadata from the first content item;
detect a match between the first metadata and at least one predetermined metadata element in a knowledge repository pertaining to a target blockchain context;
determine a first blockchain wallet address associated with the first content item;
provide the first blockchain wallet address to a blockchain search engine;
receive from the blockchain search engine a second blockchain wallet address having a transactional relationship to the first blockchain wallet address recorded in a blockchain searchable by the blockchain search engine;
query at least one content source based on the second blockchain wallet address;
responsive to querying the at least one content source based on the second blockchain wallet address, receive the second content item from the at least one content source;
extract second metadata from the second content item; and
update the knowledge repository based on the second metadata extracted from the second content item.

13. The computer storage medium of claim 12, embodying computer-readable instructions configured, when executed on at least one computer processor, to further cause the at least one computer processor to:
provide the knowledge repository, as updated based on the second metadata, to a security agent operable to perform at least one of cyberthreat detection and cyberthreat remediation based thereon,
wherein the target blockchain context is a known blockchain-related cyberthreat.

14. The computer storage medium of claim 13, wherein the knowledge repository is a malicious intent ontology.

15. The computer storage medium of claim 12, embodying computer-readable instructions configured, when executed on at least one computer processor, to further cause the at least one computer processor to:
store the first blockchain wallet address in an address database, wherein the second content item is located based on the first blockchain wallet address stored in the address database; and
store the second blockchain wallet address in the address database.

16. The computer storage medium of claim 12, embodying computer-readable instructions configured, when executed on at least one computer processor, to further cause the at least one computer processor to:
query the at least one content source based on the first blockchain wallet address;
receive from the at least one content source a third content item associated with the first blockchain wallet address;
extract third metadata from the third content item; and
update the knowledge database based on the third metadata extracted from the third content item.

17. The computer storage medium of claim 12, embodying computer-readable instructions configured, when executed on at least one computer processor, to further cause the at least one computer processor to:
receive a third content item;
extract third metadata from the third content item;
detect a match between the third metadata and the knowledge database as updated based on the second metadata.

18. The computer storage medium of claim 17, embodying computer-readable instructions configured, when executed on at least one computer processor, to further cause the at least one computer processor to:
determine a third blockchain wallet address associated with the third content item;
locate based on the third blockchain wallet address a fourth content item related to the third blockchain wallet address;
extract fourth metadata from the fourth content item; and
update the knowledge database based on the fourth metadata extracted from the fourth content item.

19. The computer storage medium of claim 17, embodying computer-readable instructions configured, when executed on at least one computer processor, to further cause the at least one computer processor to:

cause a user interface associated with a computer device to output the third content item responsive to detecting the match between the third metadata and the knowledge database.

20. The computer storage medium of claim 12, embodying computer-readable instructions configured, when executed on at least one computer processor, to further cause the at least one computer processor to:
- extract a first web address from the first content item;
- obtain, from a first web server, first web content associated with the first web address, wherein the first blockchain wallet address is extracted from the first web content;
- extract a second web address from the second content item; and
- obtain, from a second web server, second web content associated with the second web address, wherein the knowledge repository is updated based on the second web content.

\* \* \* \* \*